(12) United States Patent
Uluagac et al.

(10) Patent No.: US 12,518,025 B1
(45) Date of Patent: Jan. 6, 2026

(54) SYSTEMS AND METHODS FOR AUTOMATIC VULNERABILITY ASSESSMENT OF MACHINE LEARNING MODELS

(71) Applicants: Selcuk Uluagac, Miami, FL (US); Yassine Mekdad, Miami, FL (US); Yanzhao Wu, Miami, FL (US)

(72) Inventors: Selcuk Uluagac, Miami, FL (US); Yassine Mekdad, Miami, FL (US); Yanzhao Wu, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/264,594

(22) Filed: Jul. 9, 2025

(51) Int. Cl.
*G06F 21/00* (2013.01)
*G06F 21/57* (2013.01)

(52) U.S. Cl.
CPC ...... *G06F 21/577* (2013.01); *G06F 2221/033* (2013.01)

(58) Field of Classification Search
CPC ............. G06F 21/577; G06F 2221/033; G06F 21/566; G06F 21/563; G06F 11/3688
See application file for complete search history.

(56) References Cited

U.S. PATENT DOCUMENTS

| | | | | |
|---|---|---|---|---|
| 2020/0082097 A1* | 3/2020 | Poliakov | ............... | G06F 21/577 |
| 2020/0410228 A1* | 12/2020 | Wang | ...................... | G06F 21/55 |
| 2021/0110045 A1* | 4/2021 | Buesser | .............. | G06F 11/1471 |
| 2021/0357508 A1* | 11/2021 | Elovici | ............... | G06F 11/3612 |
| 2021/0385232 A1* | 12/2021 | Kutt | ........................ | H04L 63/14 |
| 2021/0397896 A1* | 12/2021 | Ardulov | .................. | G06V 20/56 |
| 2022/0100867 A1* | 3/2022 | Sinn | ........................ | G06N 3/094 |
| 2022/0382880 A1* | 12/2022 | Castiglione | .............. | G06N 3/08 |
| 2023/0274003 A1* | 8/2023 | Liu | ........................ | G06N 3/094 |
| | | | | 726/26 |
| 2024/0160744 A1* | 5/2024 | Hassanzadeh | ........... | G06N 5/01 |
| 2024/0283820 A1* | 8/2024 | Kochman | ............ | G06N 3/0985 |
| 2024/0386096 A1* | 11/2024 | DiValentin | ............ | G06F 21/552 |

* cited by examiner

*Primary Examiner* — Yogesh Paliwal
(74) *Attorney, Agent, or Firm* — SALIWANCHIK, LLOYD & EISENSCHENK

(57) ABSTRACT

Systems, methods, and frameworks for automatic vulnerability assessment of machine learning models are provided. The fully automated model-agnostic framework can systemically perform comprehensive adversarial testing across a wide range of public machine learning models. The modular and multi-layered architecture enhances scalability for large-scale vulnerability assessment allowing for more time and resource-efficient approach than existing technologies and tools.

16 Claims, 15 Drawing Sheets

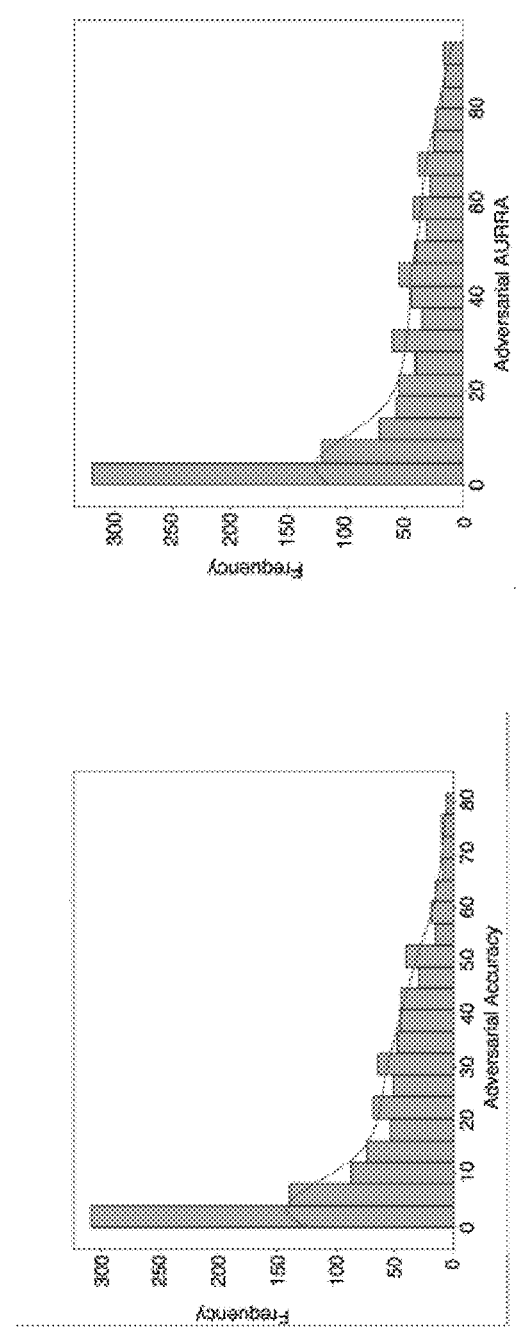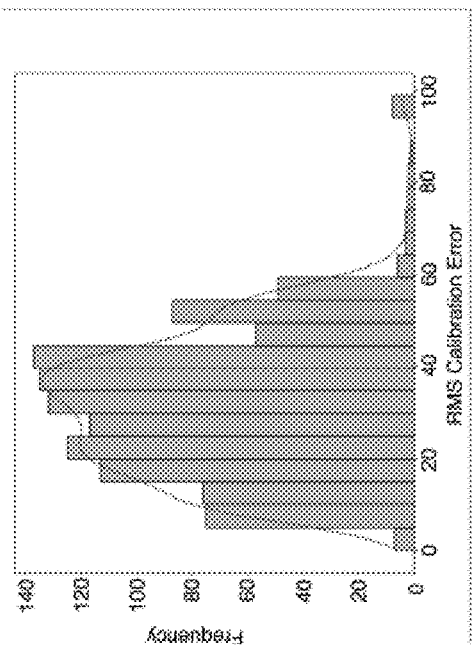
FIGS. 6(a)-6(c)

(a) Distribution of Adversarial Accuracy.

(b) Distribution of the Attack Success Rate.

(c) Distribution of the F1-Score.

| Stat. Measures (%) | Adv. Accuracy | RMS Calibration Error | Adv. AURRA |
|---|---|---|---|
| Mean | 20.39 | 32.21 | 27.32 |
| Std. Deviation | 19.72 | 15.49 | 26.53 |
| Min. Value | 0.00 | 0.15 | 0.00 |
| Q1 (25%) | 3.47 | 20.20 | 3.39 |
| Q2 (50%) | 14.27 | 32.09 | 18.86 |
| Q3 (75%) | 32.85 | 41.99 | 46.43 |
| Max. Value | 81.57 | 98.84 | 94.35 |

FIG. 11

| Statistical Measures (%) | OOD AUROC | OOD AUPR |
|---|---|---|
| Mean | 25.92 | 21.60 |
| Std. Deviation | 16.65 | 9.07 |
| Min. Value | 12.04 | 17.13 |
| Q1 (25%) | 15.53 | 17.64 |
| Q2 (50%) | 17.78 | 17.96 |
| Q3 (75%) | 25.96 | 19.22 |
| Max. Value | 87.30 | 77.93 |

FIG. 12

| Performance Metric | PGD | FGM | CW | LBFGS | DeepFool |
|---|---|---|---|---|---|
| Adv. Accuracy (%) | 43.50 | 68.22 | 58.96 | 5.48 | 80.11 |
| Precision | 0.48 | 0.73 | 0.64 | 0.05 | 0.84 |
| Recall | 0.43 | 0.68 | 0.60 | 0.05 | 0.80 |
| F1 Score | 0.43 | 0.68 | 0.59 | 0.05 | 0.80 |
| Attack Success Rate (%) | 56.50 | 31.78 | 41.04 | 94.52 | 19.89 |
| Confidence Drop | 0.57 | 0.65 | 0.62 | 0.69 | 0.73 |

SYSTEMS AND METHODS FOR AUTOMATIC VULNERABILITY ASSESSMENT OF MACHINE LEARNING MODELS

GOVERNMENT SUPPORT

This invention was made with government support under 2428696 awarded by the National Science Foundation. The government has certain rights in the invention.

BACKGROUND

In recent years, the increasing availability of publicly available machine learning (ML) models hosted on public platforms, such as Hugging Face and GitHub artificial intelligence (AI) models, has revolutionized the development of AI systems. These publicly available models are often vulnerable to a wide range of adversarial attacks, including model-stealing and membership inference attacks, which can lead to security breaches when these models are deployed in real-world applications. Despite numerous approaches proposed to enhance the robustness of these models against adversarial attacks, the number of vulnerabilities reported continues to rise.

Given the sheer volume of millions of publicly available models, it is challenging to perform manual vulnerability assessment of each individual model. To that end, public repositories that contain foundational models are particularly at risk, emphasizing the need for robust security testing and continuous monitoring. An automated vulnerability assessment system is in high demand to reduce manual effort.

BRIEF SUMMARY

In view of the challenges discussed in the Background, an automated vulnerability assessment system is in high demand to reduce manual effort. Embodiments of the subject invention provide novel and advantageous systems, methods, and frameworks for automatically assessing machine learning (ML) vulnerabilities on a large scale. Embodiments specifically address the challenges posed by adversarial attacks on several public platforms, including Hugging Face Hub, GitHub AI models, Kaggle, and TensorFlow Hub. The widespread sharing of public models introduces serious security risks due to the prevalence of vulnerabilities in these ML models. Given the sheer number of publicly available models, manual testing is impractical, demonstrating the urgent need for automated methods for vulnerability detection. An automated ML vulnerability assessment framework, which can be referred to herein as ML-RAY, can perform security testing across a wide range of public ML models. ML-RAY is a multi-layered framework and comprises six consecutive layers, including a) a hardware layer, b) a framework and libraries layer, c) a data layer, d) a model management layer, e) a security assessment layer, and f) a user interface layer. Each layer contains a set of modules and functionalities that can smoothly interact with other layers. It operates under different testing scenarios, notably white-box, black-box, and transfer attacks.

In an embodiment, a system for automatic vulnerability assessment of ML models can comprise: a processor; and a machine-readable medium in operable communication with the processor and having instructions stored thereon that, when executed by the processor, perform the following steps: i) receiving a targeted model trained on a dataset and/or on customized adversarial settings received from a user via an interface (e.g., a user interface such as a graphical user interface (GUI)); ii) storing the targeted model and/or the dataset in a local database; iii) curating the targeted model to handle model-specific requirements via preprocessing techniques, the preprocessing techniques comprising resizing, tokenization, and/or normalization; iv) loading required libraries and frameworks; v) evaluating performance of the targeted model in non-adversarial settings on validation datasets; vi) performing an automated series of adversarial attacks to assess robustness of the targeted model; vii) systematically feeding vulnerabilities found to a performance assessment module for further analysis; viii) evaluating the robustness of the targeted model according to a set of predefined performance metrics and/or storing the vulnerabilities in the local database in case the same model is requested by another user; and ix) generating a vulnerability report and providing the vulnerability report to the user. The vulnerability report can comprise a security report on the targeted model. Any or all of steps i)-ix) can be performed using a multi-layered architecture. The multi-layered architecture can comprise: a) a hardware layer; b) a framework and libraries layer; c) a data layer; d) a model management layer; e) a security assessment layer; and/or f) a user interface layer. The hardware layer can comprise a graphical processing unit (GPU) and/or a central processing unit (CPU). The framework and libraries layer can be configured to: support automating of preprocessing and configuration of the targeted model; and/or dynamically detect a framework type and architecture during execution time by integrating a set of application programming interfaces (APIs) (e.g., Transformers, MXNet, TensorFlow, Keras, and/or PyTorch). The data layer can be configured to manage data storing capabilities using dataset storage, model storage, and/or logging storage. The model management layer can be configured to monitor, deploy, and/or curate the targeted model by incorporating model curation, model deployment, and model logging. The security assessment layer can comprise a black-box attack module, a white-box attack module, an adversarial transferability module, a performance assessment module, and/or a vulnerability reporting module. The black-box attack module can comprise a natural perturbation attack and/or an out-of-distribution attack. The white-box attack module can comprise projected gradient descent (PGD) attack, fast gradient sign method (FGSM) attack, Carlini and Wagner (CW) attack, limited-memory Broyden-Fletcher-Goldfarb-Shanno (L-BFGS) attack, and/or DeepFool attack. The user interface layer can be configured to enable the user to automate testing the targeted models by combining model selection, dataset selection, and/or adversarial configuration.

In another embodiment, a method for automatic vulnerability assessment of ML models can comprise: i) receiving (e.g., by a processor) a targeted model trained on a dataset and/or on and customized adversarial settings received from a user via an interface (e.g., a user interface, such as a GUI); ii) storing (e.g., by the processor) the targeted model and/or the dataset in a local database; iii) curating (e.g., by the processor) the targeted model to handle model-specific requirements via preprocessing techniques, the preprocessing techniques comprising resizing, tokenization, and/or normalization; iv) loading (e.g., by the processor) required libraries and frameworks; v) evaluating (e.g., by the processor) performance of the targeted model in non-adversarial settings on validation datasets; vi) performing (e.g., by the processor) an automated series of adversarial attacks to assess robustness of the targeted model; vii) systematically feeding (e.g., by the processor) vulnerabilities found to a performance assessment module for further analysis; viii) evaluating (e.g., by the processor) the robustness of the targeted model according to a set of predefined performance metrics and/or storing the vulnerabilities in the local database in case the same model is requested by another user; and ix) generating (e.g., by the processor) a vulnerability report and providing the vulnerability report to the user. The vulnerability report can comprise a security report on the targeted model. The vulnerability report can comprise a security report on the targeted model. Any or all of steps i)-ix) can be performed using a multi-layered architecture. The multi-layered architecture can comprise: a) a hardware layer; b) a framework and libraries layer; c) a data layer; d) a model management layer; e) a security assessment layer; and/or f) a user interface layer. The hardware layer can comprise a GPU and/or a CPU. The framework and libraries layer can be configured to: support automating of preprocessing and configuration of the targeted model; and/or dynamically detect a framework type and architecture during execution time by integrating a set of APIs (e.g., Transformers, MXNet, TensorFlow, Keras, and/or PyTorch). The data layer can be configured to manage data storing capabilities using dataset storage, model storage, and/or logging storage. The model management layer can be configured to monitor, deploy, and/or curate the targeted model by incorporating model curation, model deployment, and model logging. The security assessment layer can comprise a black-box attack module, a white-box attack module, an adversarial transferability module, a performance assessment module, and/or a vulnerability reporting module. The black-box attack module can comprise a natural perturbation attack and/or an out-of-distribution attack. The white-box attack module can comprise PGD attack, FGSM attack, CW attack, L-BFGS attack, and/or DeepFool attack. The user interface layer can be configured to enable the user to automate testing the targeted models by combining model selection, dataset selection, and/or adversarial configuration.

BRIEF DESCRIPTION OF DRAWINGS

FIGS. 6(a)-6(c) show the frequency distribution of adversarial metrics across all the tested models. The frequency distribution indicates that a vast majority of the models are vulnerable against natural adversarial samples.

FIG. 11 shows a table of a statistical summary of performance metrics across models for natural adversarial attack.

FIG. 12 shows a table of a statistical summary of model performance metrics for natural adversarial attack and out-of-distribution attack.

FIG. 13 shows a table of performance evaluation metric results for microsoft/swinv2-tiny-patch4-window16-256 model under different adversarial attacks.

FIG. 14 shows a table of adversarial transferability evaluation across the top 10 most downloaded models under adversarial attacks. The models exhibit significant vulnerability against adversarial attacks.

DETAILED DESCRIPTION

Figure 1:
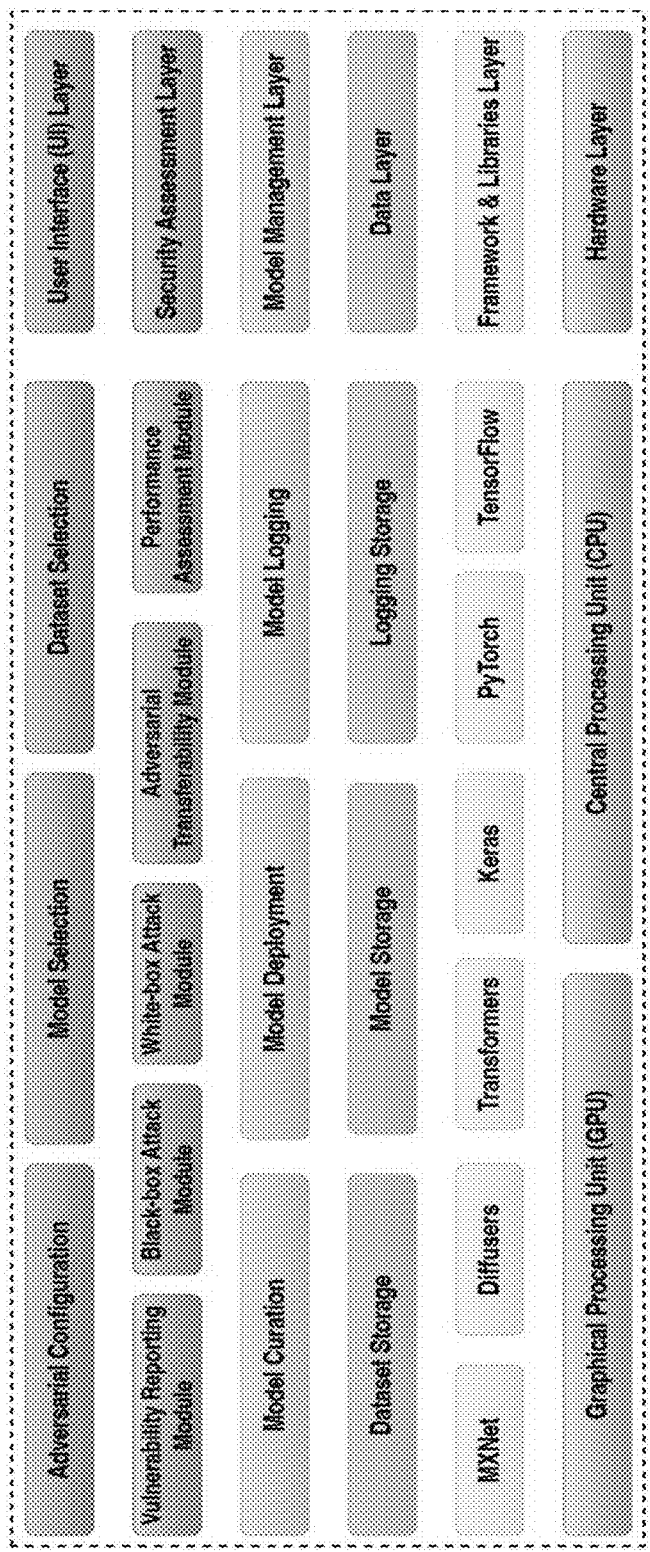
FIG. 1 shows the design, in a multi-layered fashion, of the architecture of an automated machine learning (ML) vulnerability assessment framework (which can be referred to herein as ML-RAY), according to an embodiment of the subject invention.

Embodiments of the subject invention provide novel and advantageous systems, methods, and frameworks for automatically assessing machine learning (ML) vulnerabilities on a large scale. An automated ML vulnerability assessment framework, which can be referred to herein as ML-RAY, can perform security testing across a wide range of public ML models. A design objective of ML-RAY is to automatically identify potential vulnerabilities in ML models by evaluating them against a comprehensive set of adversarial attacks. ML-RAY provides several key advantages over existing manual tools. For instance, the adversarial robustness toolbox (ART) requires manual configuration to handle model dependencies and requires manual integration of data preprocessing pipelines. Furthermore, the Foolbox library cannot automate batch testing across different models. All these testing tools such as the ART, Foolbox, and CleverHans require manual configurations and cannot be adopted for large-scale testing. ML-RAY addresses these critical issues by supporting diverse frameworks and dynamically resolving the ML dependencies. This would provide efficient security testing across thousands of models and the identification of model-specific weaknesses. ML-RAY can automatically perform exhaustive security testing of common ML vulnerabilities, thereby providing a realistic and practical tool for performing AI security testing. From a high-level perspective, ML-RAY provides a modular and multi-layered framework. Importantly, ML-RAY's modular design supports the integration of additional adversarial attacks without changing its inner architecture. Embodiments of the subject invention provide model-agnostic framework specifically designed and optimized for automatically assessing ML vulnerabilities in the unique context of AI-driven applications, which has experienced rapid growth recently. "Model-agnostic" means that a method or technique can be applied to any ML model, regardless of its internal structure or type. It is especially preferred by major companies (e.g., Google, Meta, Microsoft) to develop automated security assessments of ML vulnerabilities on a large scale.

Embodiments of the subject invention provide advantageous key features, such as: (1) automation; eliminating the need for manual vulnerability detection, therefore, enabling large-scale testing; (2) scalability; capable of analyzing thousands of models concurrently. Such an approach is time and resource-efficient; (3) multi-scenario security testing; combining white-box, black-box, and transfer attack modules for an extensive security analysis for a given model; (4) comprehensive analysis; generating a detailed vulnerability assessment (a risk level (low, medium, or high) can be assigned based on the vulnerabilities detected for each security testing module); (5) broad application; supporting diverse ML model architectures and datasets that are currently hosted on popular platforms such as Hugging Face and used by many real-world applications. A set of standard application programming interfaces (APIs) can be integrated that aims to abstract dependency requirements, thereby enabling the users to only provide model-specific configurations at the user interface layer regardless of the model's architecture.

As illustrated in FIG. 1, ML-Ray is a modular framework designed to automate the detection of vulnerabilities in public ML models. Its architecture comprises multiple layers:

Hardware Layer: It is considered the fundamental layer that contains the physical computing resources for efficient execution of ML-RAY. It fundamentally includes Graphical Processing Unit (GPU), and Central Processing Unit (CPU).

Framework and Libraries Layer: Given the diversity and variety of the frameworks and libraries used to deploy public ML models, it is essential to integrate a framework and libraries layer within ML-RAY. This layer provides the necessary tools and libraries for model deployment and testing in adversarial and non-adversarial settings. In contrast to existing tools such as the ART that requires manual configurations, ML-RAY automates preprocessing and configuration of the models by supporting the most popular frameworks and libraries. Note that the resolution of model dependencies across different frameworks and libraries poses significant challenges during adversarial testing. To that end, ML-RAY addresses such issues by dynamically detecting the framework's type and architecture during execution time. This process is automated and guarantees continuous testing across a large number of models with different architectures. In particular, the models that require preprocessing tools are managed by a set of predefined configurations that can streamline the setup and handle conflict resolution. Additionally, ML-RAY integrates a set of standard APIs that aims to abstract dependency requirements, thereby enabling the users to only provide model-specific configurations at the user interface layer regardless from the model's architecture (e.g., Transformers, MXNet, TensorFlow, Keras, and PyTorch).

Data Layer: This layer manages data storing capabilities. It encompasses the dataset storage, the model storage, and the logging storage. The dataset storage includes different types of datasets (e.g., training samples, validation samples, adversarial samples). The model storage contains the gathered models with their corresponding configuration files and versions. The logging storage captures the logs during the execution of ML-RAY in various settings.

Model Management Layer: This layer aims to monitor, deploy, and curate ML models. It incorporates three main components: model curation, model deployment, and model logging. The model curation focuses on fine-tuning and pruning the selected model. ML-RAY incorporates APIs to automate model-specific preprocessing operations (e.g., normalization, filtering, etc.). The model deployment consists of locally deploying the model to perform inference testing under adversarial and non-adversarial settings. During this process, the model logging component tracks the model's performance using different performance metrics (e.g., validation accuracy, attack success rate, etc.).

Security Assessment Layer: This layer contains the primary modules responsible for security testing and assessments to identify potential vulnerabilities. These modules include the performance assessment module, the white-box attack module, the black-box attack module, the adversarial transferability module, and the vulnerability reporting module. The performance assessment module analyzes the model's performance in adversarial and non-adversarial settings. This module provides a quantitative analysis regarding the model's performance evaluation using popular robustness metrics, such as calibration errors, attack success rate, and benchmarking metrics. The white-box attack module evaluates the model's vulnerabilities under white-box settings. ML-RAY considers popular adversarial attacks, including the projected gradient descent (PGD) attack, the fast gradient sign method (FGSM) attack, the Carlini and Wagner (CW) attack, the limited-memory Broyden-Fletcher-Goldfarb-Shanno (L-BFGS) attack, and the DeepFool attack. Additionally, the ideal scenario for ML-RAY is to evaluate a single model across a wide range of adversarial attacks. ML-RAY refers to this setup by a model-oriented evaluation. However, for large-scale testing, ML-RAY can also evaluate a large number of models against one single attack. In this case, ML-RAY refers to this setup by an attack-oriented evaluation. This duality testing enables ML-RAY to be configured for a single or multiple model testing in white-box settings, either to identify specific vulnerabilities for a given model or to identify common vulnerabilities across multiple models. Note that all the attacks mentioned above leverage the full access of the model's hyperparameters and gradients. In contrast, the black-box attack module evaluates the model's robustness without internal knowledge. ML-RAY tests challenging samples such as natural adversarial samples and out-of-distribution samples. These attacks under black-box settings represent a real-world simulation of attack scenarios in which the model details are unavailable. The natural adversarial example is a query-based adversarial attack that presents challenging inputs that can naturally misclassify the models. This attack can test the model's robustness without invoking perturbation to the samples. On the other hand, out-of-distribution samples are out of the model's training distribution and can cause misclassification with high confidence or low anomaly scores. This class of samples enables testing the model's uncertainty under data distribution shift. The adversarial transferability module examines the presence of transferable attacks across models. This module aims to identify if the model's weaknesses can also be transferred to other models that share similar architecture or training datasets. The goal of this module is to generalize, to some extent, the vulnerabilities of a given model. Finally, the vulnerability reporting module generates a report that summarizes the detected vulnerabilities, their impact, and risk level.

User Interface Layer: This layer enables users to test their own models by supporting a wide range of model architectures. It provides standard APIs, such as Hugging Face APIs, so that users can implement their models for automated testing. This flexibility ensures a smooth integration of ML-RAY into the user's pipelines without manual configurations. This layer consists of three main features, which are the model selection, the dataset selection, and the adversarial configuration. In the model selection, the user chooses the model to be tested. Then, in the dataset selection, the user provides the datasets under which the model has been trained. Finally, in the adversarial configuration, the user provides the desired customization parameters and testing settings.

Figure 2:
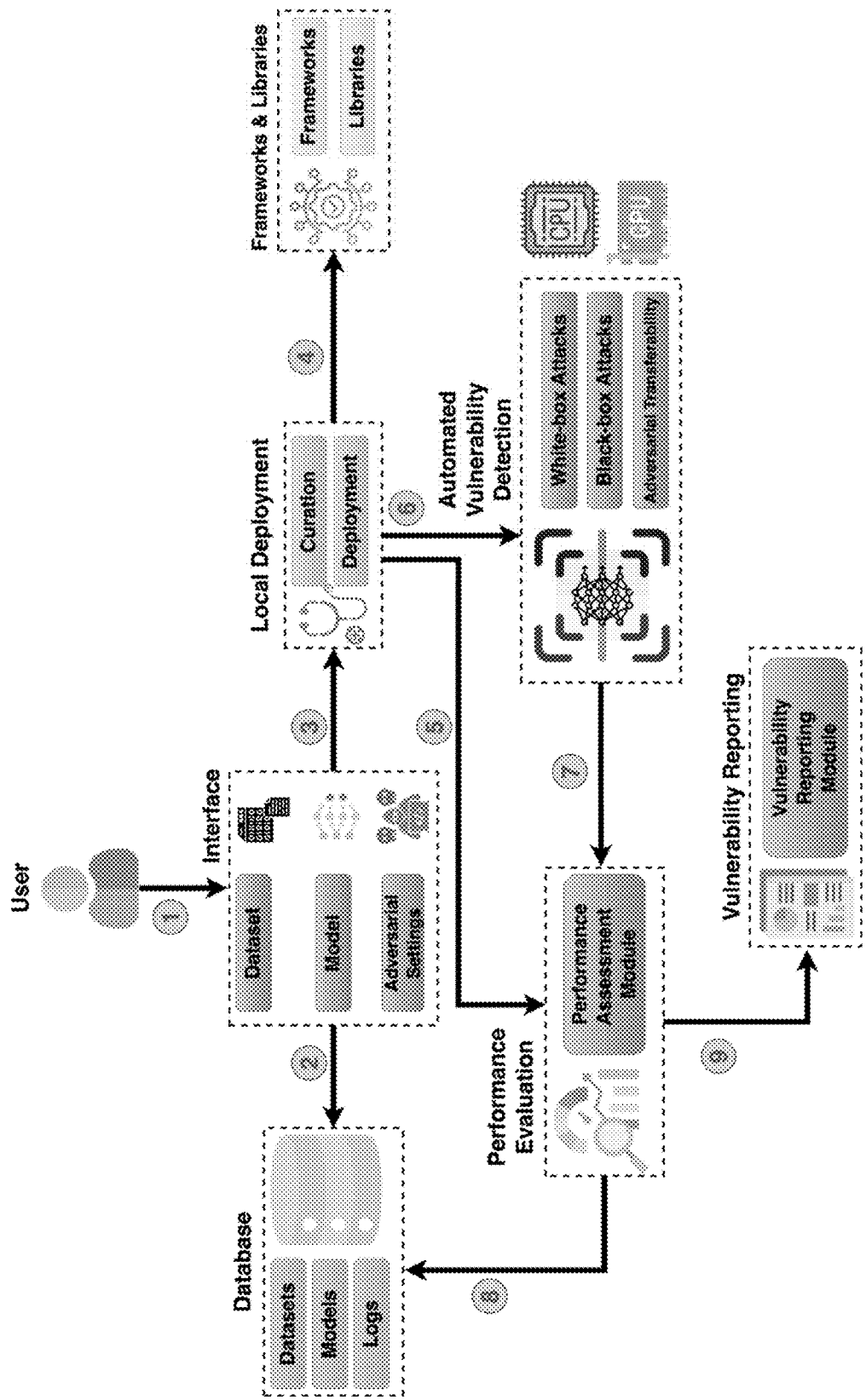
FIG. 2 shows the architecture of the ML-RAY system, demonstrating a streamlined automatic vulnerability assessment pipeline. ML-RAY automates vulnerability assessment pipeline and workflow.

Embodiments of the subject invention provide a streamlined workflow that enables automated vulnerability assessment. FIG. 2 illustrates this process. In Step 1, a user selects via an interface a targeted model, a dataset under which a model has been trained, and customized adversarial settings. In Step 2, ML-RAY stores the model and dataset in a local database. Afterward, the model is curated to handle model-specific requirements. This process is performed via preprocessing techniques, including resizing, tokenization, and normalization in Step 3. It also includes loading required libraries and frameworks in Step 4. Once the model is locally deployed, ML-RAY evaluates the model's performance in non-adversarial settings in Step 5 on validation datasets. This evaluation provides insight into the initial model performance before conducting the vulnerability testing. Next, ML-RAY performs an automated series of adversarial attacks to assess the model's robustness in Step 6. Note that these adversarial attacks are performed according to the user-defined adversarial configurations, enabling a consistent and scalable security assessment without requiring manual efforts. Then, ML-RAY systematically feeds the vulnerabilities found to the performance assessment module for further analysis in Step 7. This module evaluates the model's robustness according to a set of predefined performance metrics and stores the identified vulnerabilities in the database in case the same model is requested by another user in Step 8. This automated approach guarantees efficient security testing cycles across a large number of models and adversarial configurations. Finally, ML-RAY generates a vulnerability report to the user that contains a security report on the model in Step 9.

The public accessibility and widespread adoption of popular ML platforms (e.g., Hugging Face) by various users and organizations potentially pose serious risks in real-world applications. The adversaries can leverage the absence of standardized secure adoption of shared public models and datasets to exploit potential ML vulnerabilities. To build a comprehensive understanding of potential threats, an adversary capable of performing adversarial attacks under both black-box and white-box settings against publicly available models is assumed.

Figure 3:
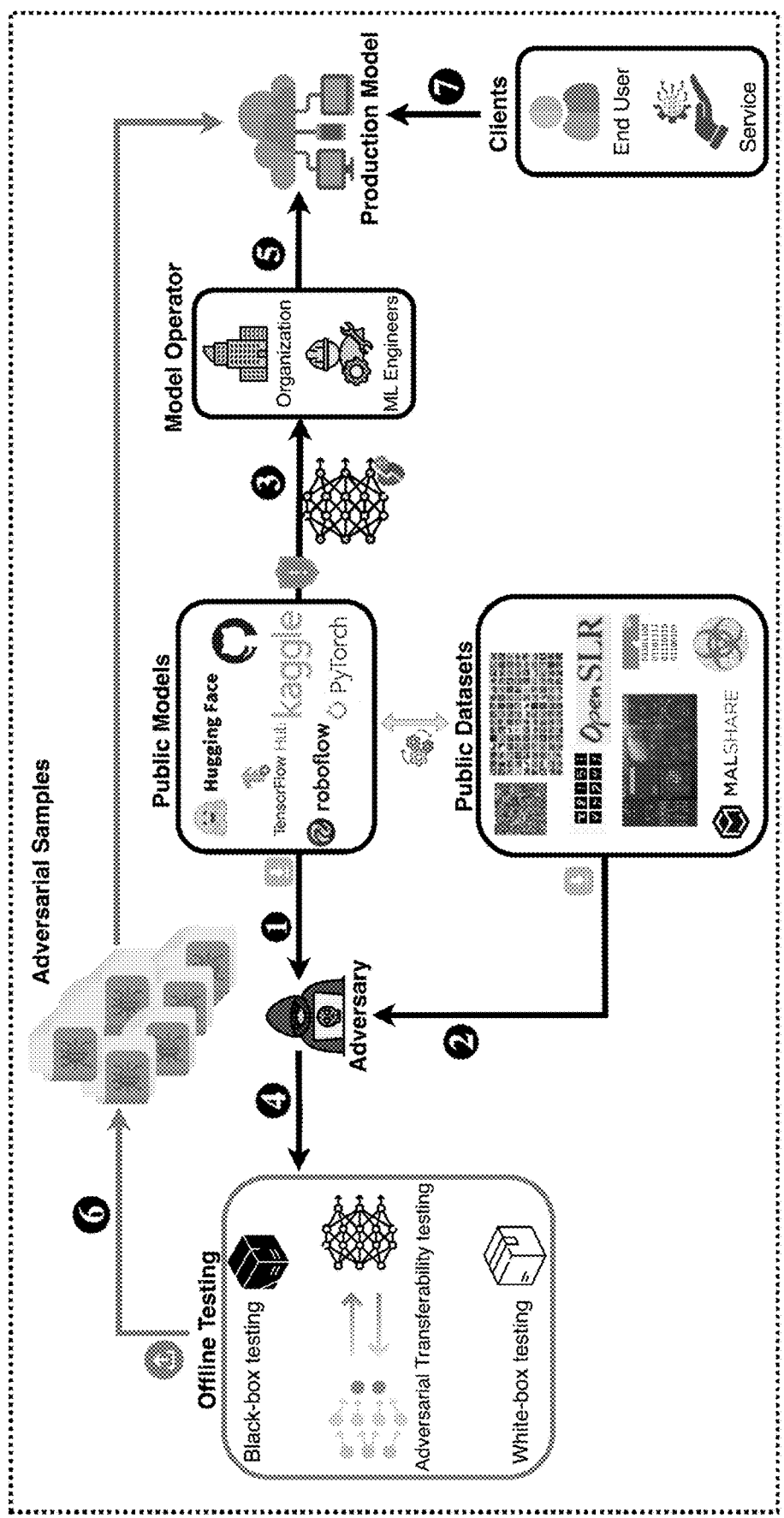
FIG. 3 shows the threat model for adversarial attacks against public ML models deployed in production environments.

Moreover, the adversary can perform transferability testing across the models. FIG. 3 illustrates a concrete threat model that can outline realistic adversarial attacks in a production environment. In Step 1, the adversary downloads publicly available models. These models are hosted on popular public ML platforms including Hugging Face, TensorFlow Hub, and Kaggle. Afterward, the adversary downloads the corresponding datasets on which the models were trained in Step 2. Note that the adversary can also consider challenging datasets that might cause misclassifications across various models. On the other hand, the model operator, unaware of the presence of any security issues, downloads the model in Step 3. Then, the necessary improvements are implemented, such as model validation, performance evaluation, and fine-tuning before model deployment in a production environment in Step 5. At this point, the adversary simulates several adversarial attacks under white-box and black-box settings in the offline testing mode. Moreover, the adversary may check for additional weaknesses of the models by performing transferability testing across other models with similar architectures and/or trained on the same datasets in Step 4. Following the offline testing, the adversary generates adversarial samples designed to cause misclassifications and/or abnormal model behaviors in Step 6. Eventually, these adversarial inputs can directly compromise production models that interact with the end users and support real-world applications/services in Step 7.

ML models exhibit vulnerabilities when exposed to adversarial examples. These examples can be defined as carefully crafted samples that can induce misclassification during the testing phase. Although such vulnerabilities are commonly known in the computer vision domain, recent work has demonstrated the presence of this problem in the cybersecurity domain. In particular, a wide range of detection systems, notably intrusion detection systems and malware detection systems, are prone to adversarial attacks. Fundamentally, adversarial attacks can occur in two different settings: (i) white-box settings and (ii) black-box settings. In a white-box setting, the adversary has full knowledge of the target model, including its inner architecture and hyperparameters. While under black-box settings, the adversary has no prior knowledge and only has access to the input and output behavior of the model. Embodiments of the subject invention consider both settings to explore the adversarial capabilities in any given scenario.

Black-box attacks: In black-box settings, the adversarial attacks consist primarily of deceiving ML models by introducing imperceptible changes to input data before being fed into the targeted model, causing the model to misclassify the data. These attacks have a wide range of techniques specifically tailored to exploit vulnerabilities in these systems. In this context, it is worth mentioning two interesting classes of adversarial attacks to investigate under black-box settings, namely natural adversarial examples and out-of-distribution examples. The first class consists of real-world samples that can radically change the model classification without intentional modification of the samples themselves. Instead of adding carefully crafted tiny perturbations to the original samples, such as the ones generated using gradient-based attacks (e.g., IFGSM attack, JSMA attack), the samples themselves can naturally cause misclassification. These challenging samples were collected using an adversarial filtration technique, which consists of manually filtering the samples that cannot be classified from a popular model and can be incorrectly classified for other unseen models. Instances of this class are commonly known in the computer vision domain and include the ImageNet-A datasets, as well as the ObjectNet datasets. However, other domains can also include natural adversarial examples (e.g., benign obfuscated samples, benign encrypted network traffic, and unexpected legitimate user behaviors). The second class (out-of-distribution examples) refers to the samples that are out of the model's training distribution and can cause misclassification with high confidence or low anomaly scores. This class enables testing the model's uncertainty under data distribution shift. In fact, out-of-distribution samples can represent an intriguing case of substantial model performance degradation given the margin errors in the classification. More specifically, in dynamically changing data-driven systems, the periodic change in key features and characteristics of a wide variety of samples over an extended period can lead to poor performance of the classifiers. For these reasons, the classes of adversarial attacks are selected under black-box settings to assess the potential weaknesses that the target models might exhibit in their decision boundaries. Therefore, the resilience of the target models can be measured against common adversarial samples besides the gradient-based generated ones.

White-box attacks: Regarding white-box settings, five popular adversarial attacks are considered as a primary attack vector to assess the robustness of public models: (i) the PGD attack, (ii) the FGSM attack, (iii) the CW attack, (iv) the L-BFGS attack, and (v) the DeepFool attack. Gradient-based attacks are considered given the adversary's capabilities of accessing the target model, its inner architecture, hyperparameters, and gradients. More specifically, the gradients of the target model are computed in regard to the input data to generate adversarial samples. These computations enable a maximization of the target's model loss. In what follows, a brief description of each adversarial attack is provided.

Projected Gradient Descent (PGD) attack: This attack is an iterative method where the perturbations are applied in the input data for each iteration into a lp-ball predefined radius. The PGD attack mainly aims to deceive image classification models. By iteratively perturbing the input images in the direction of the gradient of the loss function, the perturbations are bounded within a range. The adversarial sample x'+1 that is being updated iteratively to maximize the loss function ($\nabla_x L(\theta,x,y)$) is generated. The process is iterated until the samples are misclassified by the target model or the pre-defined maximum number of iterations is reached. The PGD attack can be described by the following equation:

$$x^{t+1} = \Pi_{x+S}(x^t + \alpha \, \text{sign}(\nabla_x L(\theta,x,y))). \quad (1)$$

Let $x^t$ denote the input at the iteration of t in the adversarial example. Here, $\alpha$ is the step size and the rest is the sign of the gradient of the loss function with respect to the input, x. $\Pi$ is the projection that clips the perturbations within the perturbation range S.

Fast Gradient Sign Method (FGSM) attack: The FGSM attack is a well-known attack that perturbates input data with a bounded adversarial noise. Such noise maximizes the loss function to misclassify target models. This adversarial attack is most effective on models that rely on gradient-based optimization such as neural network models and may not be directly applicable to other models employing algorithms such as Random Forest (RF) classifiers. The adversarial sample $x_{adv}$ for a given input x is generated using the following equation:

$$x_{adv} = x + \varepsilon \cdot \text{sign}(\nabla_x J(\theta,x,y)) \quad (2)$$

where $\varepsilon$ represents the strength of the attack, which is a small value that guarantees minimal perturbations. J is the loss function of the model and $\nabla_x J(\theta,x,y)$ is the computed gradient resulting in a vector. The vector indicates the direction to adjust x to maximize the loss.

Carlini & Wagner (CW) attack: The CW attack generates high-confidence adversarial examples by accessing the parameters and architecture of the network. However, it has a high-cost generation of adversarial examples. The CW attack methodology can be performed under three different attack scenarios that can be referred to as distance metrics: $L_2$, $L_0$, and $L_\infty$. In the $L_2$ attack, given a benign sample s and a chosen target class t different from the benign class of s ($t \neq C^*(x)$), the attacker's goal is to search for the value w minimizing the following expression:

$$\min_w \left\| \frac{1}{2}(\tanh(w) + 1) - x \right\|_2^2 + c \cdot f\left(\frac{1}{2}(\tanh(w) + 1)\right). \quad (3)$$

Note that c is an acceptable constant, and f is a function defined as follows:

$$f(x') = \max(\max\{P(x')_i : i \neq t\} - P(x')_t, -T). \quad (4)$$

Let P represent the outcome of all layers, excluding the softmax layer, and let T be a parameter used to control the degree of adversarial examples. The $L_0$ attack is the iterative version of the $L_2$ attack. It consists of computing the gradient of f and evaluating the adversarial sample of the L2 attack. In other words, for a solution $\delta$ returned from $L_2$ attack regarding a benign sample s, its gradient g that is defined is computed as follows:

$$g = \nabla f(s+\delta). \quad (5)$$

It is worth mentioning that the $L_0$ is more challenging than the $L_2$ attack. The $L_\infty$ attack relies on naively minimizing the following equation to generate adversarial examples:

$$\min_\delta c \cdot f(s + \delta) + \|\delta\|_\infty. \quad (6)$$

L-BFGS attack: It is a nonlinear gradient strategy that involves increasing the prediction error and optimizing the input data in order to generate adversarial examples. The L-BFGS approach can be considered as a box-constrained optimization methodology for generating adversarial examples, with the same intention of minimizing perturbations for an input. Given a classifier F, a minimizer r, a target label l, and S as inputs, the L-BFGS attack is formally expressed as:

$$\min_{Adv_S} \|S - Adv_S\|_2^2 \text{ subject to: } F(S + r) = l. \quad (7)$$

However, the problem presented in Eq. 7 is highly nonlinear and time-consuming. The following equation is an approximation to solve the optimization problem based on the usage of box-constrained L-BFGS:

$$\min_{Adv_S} c \cdot \|S - Adv_S\|_2^2 - l(\theta, S, Z). \quad (8)$$

The above-mentioned estimation is used to determine the minimum positive scalar c that satisfies the minimizer r in the Eq. 7.

DeepFool attack: The DeepFool attack finds the minimal perturbation needed to move the sample across the decision boundary of a classifier. By computing the gradient of the decision boundary, the DeepFool Attack aims to adjust the input in a direction that minimizes the distance with respect to the boundary. As these small perturbations are difficult to distinguish, the model can be easily misclassified. The minimal perturbation r, which is enough to change the estimated label $\hat{k}(x)$ is defined.

$$\Delta(x; \hat{k}) := \min_r \|r\|_2 \text{ subject to } \hat{k}(x + r) \neq \hat{k}(x) \quad (9)$$

Adversarial Transferability: The wide adoption of ML models in diverse tasks has stimulated not only their inherent weaknesses and vulnerability under adversarial attacks but also the possibility of transferring such attacks across different models. This property is known as transferability and constitutes a serious threat in real-world applications. Therefore, it is crucial to understand to what degree adversarial transferability holds across public models. In this context, embodiments comprehensively evaluate within ML-RAY the adversarial transferability for a given public model.

Regarding the adversarial configuration, embodiments of the subject invention perform an automated and exhaustive analysis of the collected models by considering all the predefined modules by ML-RAY. It automatically tests thousands of models regarding their robustness against several adversarial attacks. Then, it outputs evaluation results for further analysis. Next, ML-RAY generates detailed vulnerability reports for each model. These reports summarize the findings from the considered adversarial attacks, highlighting the identified vulnerabilities for each model. Note that these reports include adversarial and non-adversarial performance metrics, with possible recommendations to improve the security of the vulnerable ML models. In what follows, embodiments of the subject invention provide a detailed description and main functionalities for each module in the security assessment layer.

Black-box Attack Module: In this module, ML-RAY evaluates the model's stability against challenging samples. Such evaluation investigates the model's ability to defend against adversarial samples regardless of their complexity. In this case, the Black-box Attack Module does not have access to the model's weights, inner neural architecture, or hyperparameters. While the majority of adversarial attacks implement query-based attacks or transfer-based attacks, ML-RAY considers two typical black-box attacks that could simulate plausible threat vectors. Notably, the natural perturbation attack and the out-of-distribution attack. The natural perturbation attack involves natural adversarial samples. These are clean natural samples, yet challenging samples that can naturally cause misclassification to ML models. This is explained by the adversarial filtration under which these samples have been selected. The second type of attack consists of exploiting the model by providing inputs outside the training distribution. This is particularly important in maintaining prediction reliability for security-sensitive models.

White-box Attack Module: With this module, ML-RAY has full access to the model's neural network architecture, training datasets, hyperparameters, and weights. In this setting, ML-RAY can generate adversarial samples by leveraging the gradient information of the model. To that end, ML-RAY considers five popular adversarial attacks, namely the PGD attack, the FGSM attack, the CW attack, the L-BFGS attack, and the DeepFool attack. Note that ML-RAY generates adversarial samples (usually from the validation set) for each of these attacks.

Adversarial Transferability Module: The advancements in ML services have motivated adversaries to explore the possibility of transferring adversarial attacks across the models. This property is known as attack transferability and is considered a crucial security aspect within the adversarial ML space. To that end, ML-RAY evaluates this property within the Adversarial Transferability Module. This module can be configured in three different settings. The first setting is referred to as cross-model transferability and evaluates the transferability across the models trained on the same datasets. The second setting is referred to as cross-training transferability and evaluates the transferability property across the models trained on different datasets but share the same network architecture. Lastly, the third setting is referred to cross model and training transferability. In this setting, ML-RAY evaluates the transferability across models trained on different datasets and with different network architectures.

Performance Assessment Module: It is worth mentioning that the performance evaluation of the models should be monitored and tracked during the entire security testing. This would guarantee an efficient security assessment of the model's robustness. For these reasons, ML-RAY incorporates several performance metrics. These metrics can be broadly categorized into non-adversarial metrics and adversarial metrics. The non-adversarial metrics evaluate the model's performance in the absence of adversarial perturbations, while the adversarial metrics evaluate the model's performance in the presence of adversarial perturbations. Note that for the Black-box Attack Module, the White-box Attack Module, and the Adversarial Transferability Module in the security assessment layer, ML-RAY considers specific performance metrics. Besides, the Performance Assessment Module defines by default benchmarking metrics that measure the model's performance prior to its local deployment. These metrics are non-adversarial and are stated as follows: the validation accuracy, the validation loss, the precision, the recall, and the F1 Score. For the Black-box Attack Module, the following adversarial metrics are considered for the natural perturbation attack: the adversarial accuracy and the adversarial area under the response rate accuracy curve (AURRA). Additionally, the out-of-distribution (OOD) attack within the Black-box Attack Module considers OOD samples, which might not be inherently adversarial. ML-RAY considers OOD samples as adversarial samples given their potential misclassification risks by the models with high confidence. Therefore, for the out-of-distribution attack, the following adversarial metrics are considered: The OOD root mean squared (RMS) Calibration Error, and the OOD area under the receiver operating characteristic Curve (AUROC). Regarding the White-box Attack Module, ML-RAY considers the following adversarial metrics for both model-oriented evaluation and attack-oriented evaluation: the attack success rate (ASR), and the confidence drop. Finally, for the Adversarial Transferability Module, ML-RAY incorporates the following adversarial metric: the transferability success rate (TSR), the adversarial accuracy on the target model, and the cross-model transferability rate.

Figure 4:
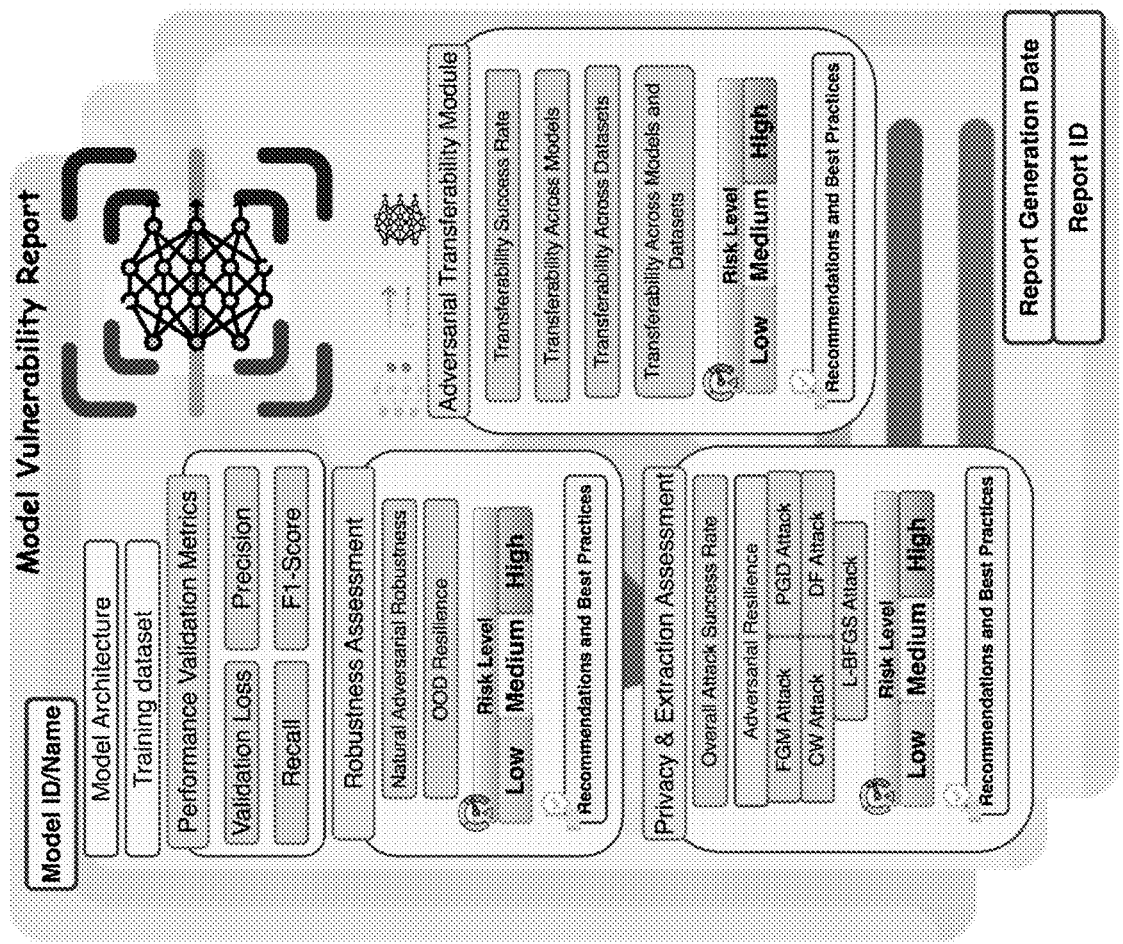
FIG. 4 shows a sample of a ML-RAY model vulnerability report.
Figure 5A:
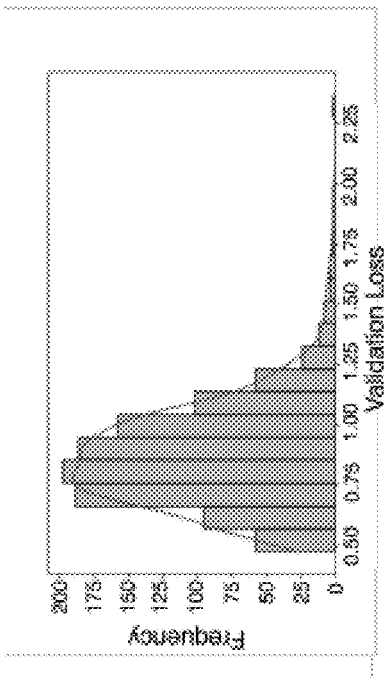
FIGS. 5(a)-5(d) show the frequency distribution of the non-adversarial performance metrics across all the tested models against the validation set. The key metrics include the validation accuracy, the validation loss, the precision, and the F1 Score.
Figure 5B:
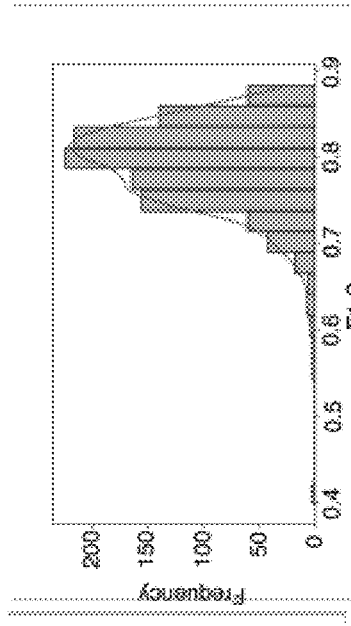
Figure 5C:
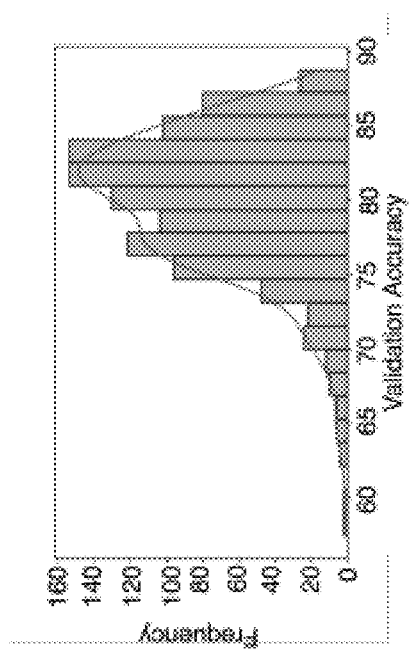
Figure 5D:
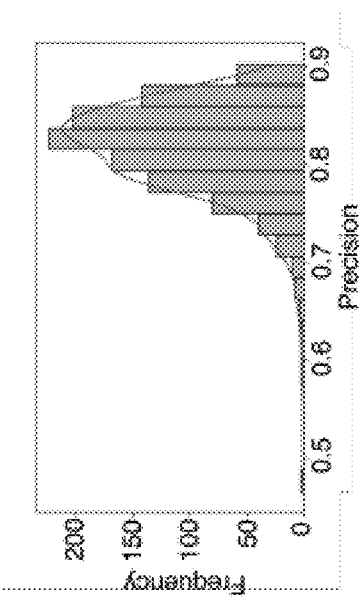

Vulnerability Reporting Module: In this module, ML-RAY generates vulnerability reports that provide details about the model's robustness according to the adversarial and non-adversarial performance metrics. Additionally, the Vulnerability Reporting Module assigns a risk level (low, medium, or high) based on the vulnerabilities detected for each security testing module. ML-RAY defines the risk level as high if the attack is successful more than 70%. This high risk implies significant vulnerabilities within the model. If the attack success rate is between 40% and 70%, ML-RAY categorizes the risk level as medium. Such risk level suggests a moderate robustness of the model against adversarial attacks. Otherwise, if the risk level is below 40%, ML-RAY classifies the risk as low. Then, ML-RAY suggests recommendations and best practices. This would provide the user with a comprehensive vulnerability analysis of the model, with further actions towards enhancing the model's resilience against adversarial attacks. FIG. 4 illustrates a sample for ML-RAY's model vulnerability report generation.

Embodiments of the subject invention provide a focused technical solution to the focused technical problem of how to automatically assess ML vulnerabilities on a large scale. The solution is provided by the multi-layered design and modular architecture. The systems and methods of embodiments of the subjection invention allow for a streamlined and automated security testing workflow for large-scale vulnerability assessments. Embodiments of the subject invention can improve the computer system assessing security vulnerabilities in ML models by efficiently performing the assessment compared to related art systems (this can free up memory and/or processor usage).

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Materials and Methods

The hardware used for experiments utilized Intel Xeon Gold 6250 CPU, with a base clock speed of 3.90 GHz and 32 CPU Cores. The system was equipped with 200 GB of RAM, thus providing sufficient memory to locally deploy large models. Moreover, three NVIDIA GPU graphic cards GA104CL (RTX A4000) for accelerating computation as part of ML-RAY architectural design was used. A total of 30 TB of storage, which was divided across internal and external storage was set up. Regarding the software configuration, the Linux Mint 21.2 Cinnamon v5.8.4 operating system for its stability and wide support was used.

ML-RAY was tested with public models hosted on Hugging Face Hub platform, which is one of the largest AI communities for public models. Currently, it contains over one million models with over 200 k datasets. Furthermore, over 10 k companies use Hugging Face's platform for ML and AI development. For these reasons, a large collection of models with different architectures trained on one specific type of dataset was included to ensure comprehensive coverage for automated security testing against adversarial attacks.

As a prototype, the ImageNet-1k dataset, which is one of the most popular benchmarking datasets used in image classification tasks for the computer vision domain, was used. It is also known as the ImageNet Large Scale Visual Recognition Challenge (ILSVRC). The ImageNet-1k dataset contains more than one million training samples divided across 1000 different classes. From Hugging Face Hub platform, all the models trained on the ImageNet dataset were selected. In this process, the models with key attributes such as their architecture, training data, and deployment context were collected and annotated. Furthermore, the models were pre-processed to be compatible with the automated testing pipeline (ref. Model Curation). This would enable a streamlined testing and analysis of the models. To maintain the traceability and reproducibility of the prepared models (ref. Model Deployment), ML-RAY considers logging capabilities for each experiment (ref. Model Logging). For instance, the considered model version, the hyperparameters, and the performance metrics are to be tracked throughout the testing process (ref. Performance Assessment Module). This would significantly facilitate the continuous monitoring of the model and would also track the model's performance under different adversarial attacks.

To build a comprehensive collection of models for image classification tasks, public models from Hugging Face platform, which were trained on the ImageNet-1k dataset were carefully crawled and curated. The 1355 models, all of which had their trained datasets field explicitly marked as "imagenet-1k" were collected. Some models might not have explicitly stated their training datasets. In this case, the model collection was extended by including an additional 27 models. These models, while having an empty trained datasets field, contained "imagenet-1k" in their model tags. This inclusion ensures that the model collection is as exhaustive as possible. Finally, to maintain the relevance and utility of the model collection, models trained on the ImageNet-1k dataset that are not intended for image classification tasks were omitted. Out of the 1381 models in the final dataset, all the models with API-based inference to validate their usability for online inference without local deployment were tested. Additionally, 1181 models (85.5%) included a config.json file. This configuration file provides metadata about the model architecture and parameters for smooth reconfiguration and preprocessing. However, the remaining 200 models (14.5%) lack configuration files, which limits their flexibility for custom training or inference adjustments.

Example 1—Initial Performance Evaluation

In the Performance Assessment Module, the performance of the collected models on the validation set to assess their initial performance was carefully evaluated. FIGS. 5(a)-5(d) provide a frequency distribution of all the models based on the non-adversarial performance metrics. These metrics include the validation accuracy, the validation loss, the precision, and the F1 Score. The models' validation accuracy tended toward higher values, ranging between 75% and 85%. This accuracy range highlights that most models present a fair performance on the validation set. The validation loss distribution shows a very narrow peak of the models around 0.75. Furthermore, the precision distribution is quite centered between 0.7 and 0.85. Similarly, the F1 Score exhibits a frequency distribution comparable to the precision. This similarity confirms a good model predictive performance under benign settings. Overall, the initial performance evaluation of the models across the validation set demonstrates a good performance for further evaluation.

Example 2—Black-Box Attack Module Evaluation

In the Black-box Attack Module, the natural adversarial attack and the out-of-distribution attack were considered. For the natural adversarial attack, the models across three performance metrics, namely the adversarial accuracy, the adversarial Area Under the Response Rate Accuracy Curve (AURRA), and the Root Mean Squared (RMS) Calibration Error were evaluated as outlined in FIG. 11. Regarding the out-of-distribution attack, two major performance metrics, namely the Out Of Distribution (OOD) Area Under the Receiver Operating Characteristic Curve (AUROC) and the OOD Area Under the Precision-Recall curve (AUPR) metric were used to assess the robustness of the models as shown in FIG. 12. Afterward, a pairwise metric analysis was conducted. It measures the model's vulnerability by observing the distribution change between the in-distribution samples (i.e., natural adversarial samples) and the out-of-distribution samples.

Natural Adversarial Attack: It can be observed from FIG. 11 that the models demonstrated a high variance in accuracy, with an adversarial accuracy varying from 0% to 81.57%. On average, the models correctly classified the adversarial samples with 20.39% accuracy. This is verified by a moderate RMS calibration error of 32.21%. On the other hand, the average adversarial AURRA is quite low. This would indicate a very limited accuracy of the models under adversarial attacks. While some models completely failed to classify the adversarial samples with a high RMS calibration error that reaches 98.84%, other models achieved a high adversarial accuracy of 81.57%. Furthermore, the standard deviation shows a relatively high variation in terms of adversarial accuracy and AURRA across the models, ranging from 19% to 26%. To verify this variation, different quartiles (i.e., Q1, Q2, and Q3) were computed to understand the statistical distribution of the performance metrics across the models. For all the quartiles, the distribution is quite skewed, with low adversarial accuracy, and only the third quartile of the models exhibits a high adversarial accuracy by more than 32%. Interestingly, more than 50% of the models suffer from high RMS calibration errors (i.e., second and third quartile). Further, the adversarial AURRA is below 4% only in the first quartile. This shows a significant imbalance between the model's robustness and accuracy.

To better visualize the natural adversarial attack, a frequency distribution analysis for the considered metrics across all the tested models was conducted. FIGS. 9(a)-9(f) show a high frequency of the models with low adversarial accuracy, implying that the majority of the models are quite vulnerable under natural adversarial samples, and only a few models exhibit robustness against these samples. Similarly, the distribution of adversarial AURRA demonstrates the challenge of public models to maintain their performance when tested against natural adversarial samples. Meanwhile, the frequency distribution of the RMS calibration error shows confidence instability across models.

Out-of-distribution Attack: Following the same statistical measures on the natural adversarial attack, FIG. 12 provides the statistical summary of the model's performance for the out-of-distribution attack. OOD AUROC and OOD AUPR were considered as performance metrics. First, the average OOD AUROC as well as the average OOD AUPR are quite low, with only 25.92% and 21.60%, respectively. This indicates that the models suffer from poor prediction accuracy under out-of-distribution samples. Moreover, the standard deviation is very low with 9.07% on the OOD AUPR. On the other hand, all the quartiles are close to each other. This narrow range demonstrates that only a very small number of models are robust in out-of-distribution settings.

Figures 7A, 7B:
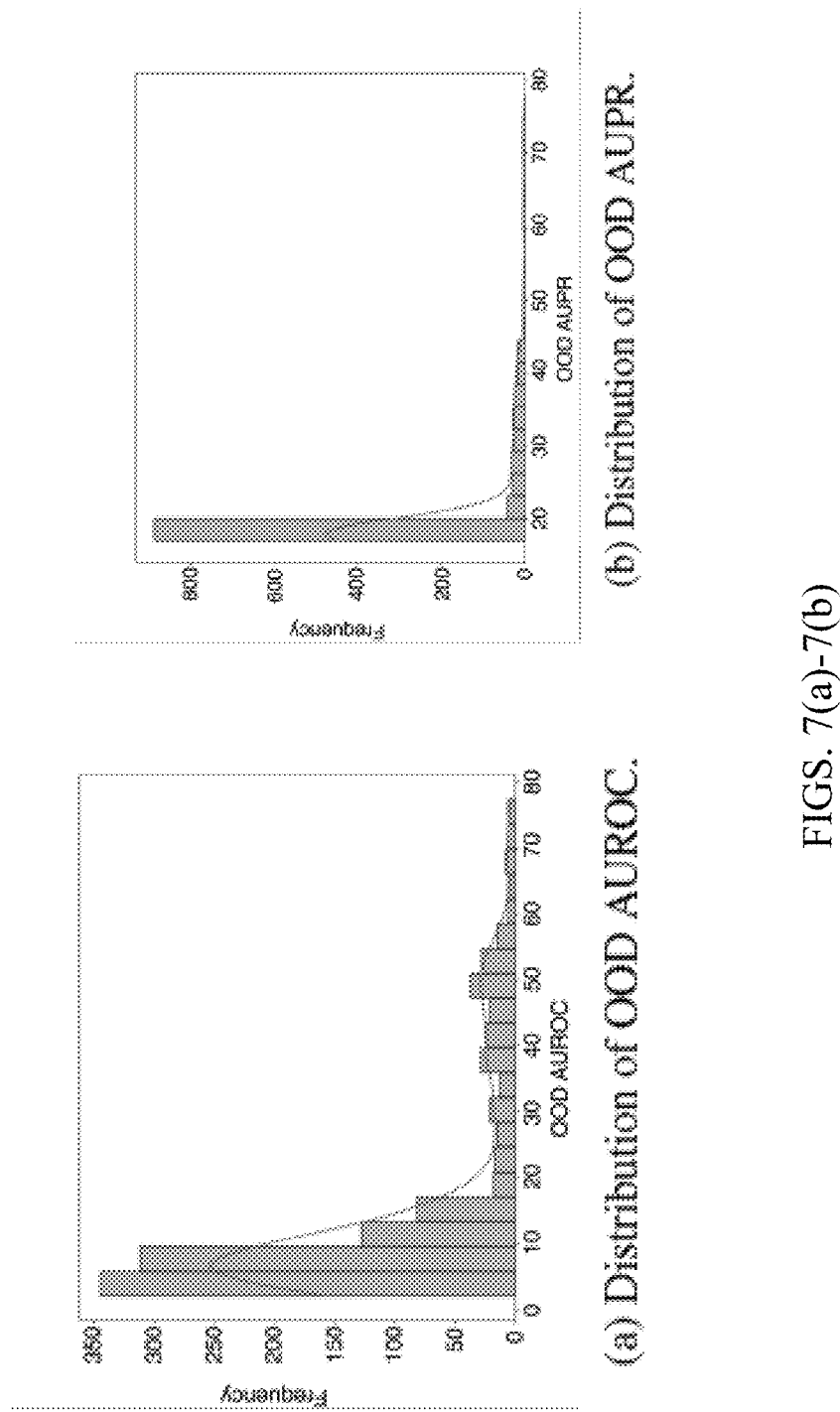
FIGS. 7(a)-7(b) show the frequency distribution of out-of-distribution metrics across all the tested models. The distribution highlights potential vulnerabilities of some models against out-of-distribution samples.
Figures 8A, 8B, 8C, 8D, 8E, 8F:
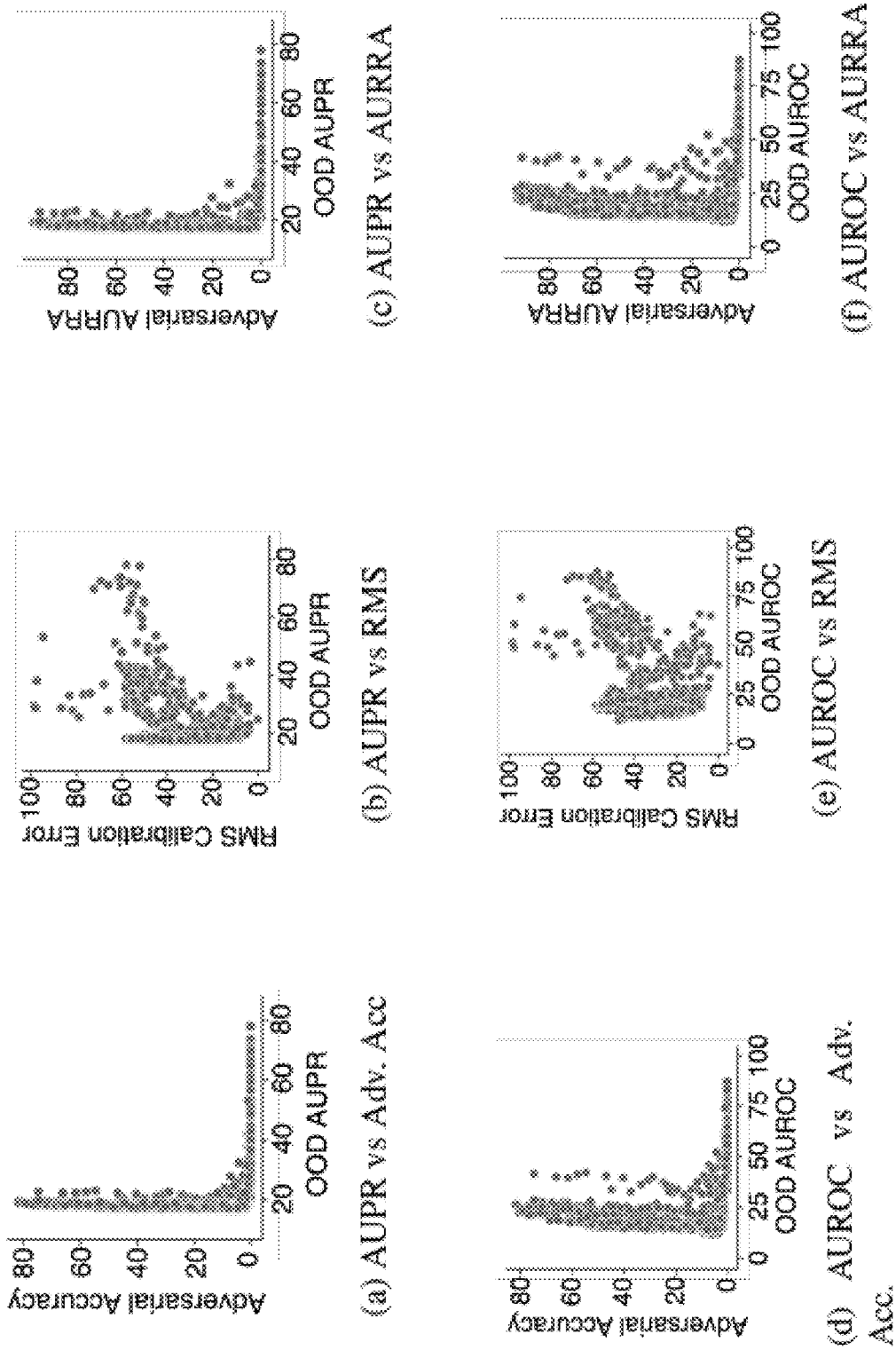
FIGS. 8(a)-8(f) show the pairwise relationship between the adversarial metrics and the out-of-distribution metrics.
Figure 9A:
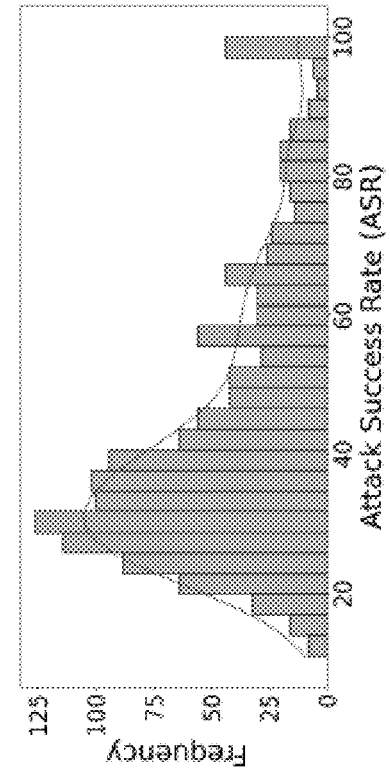
FIGS. 9(a)-9(f) show the frequency distribution of difference performance metrics across all the tested models. The key metrics include the adversarial accuracy, the attack success rate, the F1 Score, confidence drop, precision, and recall.
Figure 9B:
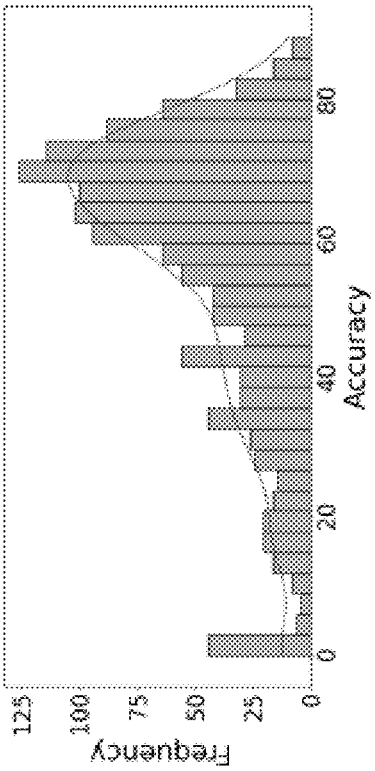
Figure 9C:
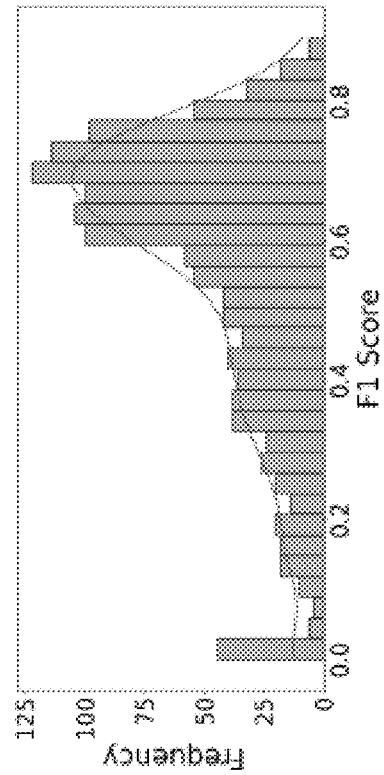
Figure 9D:
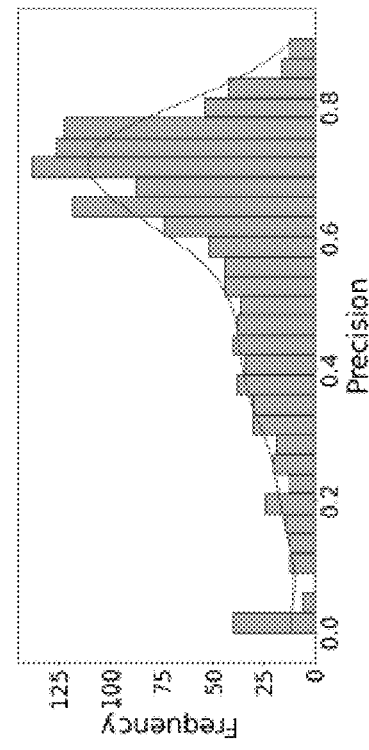
Figure 9E:
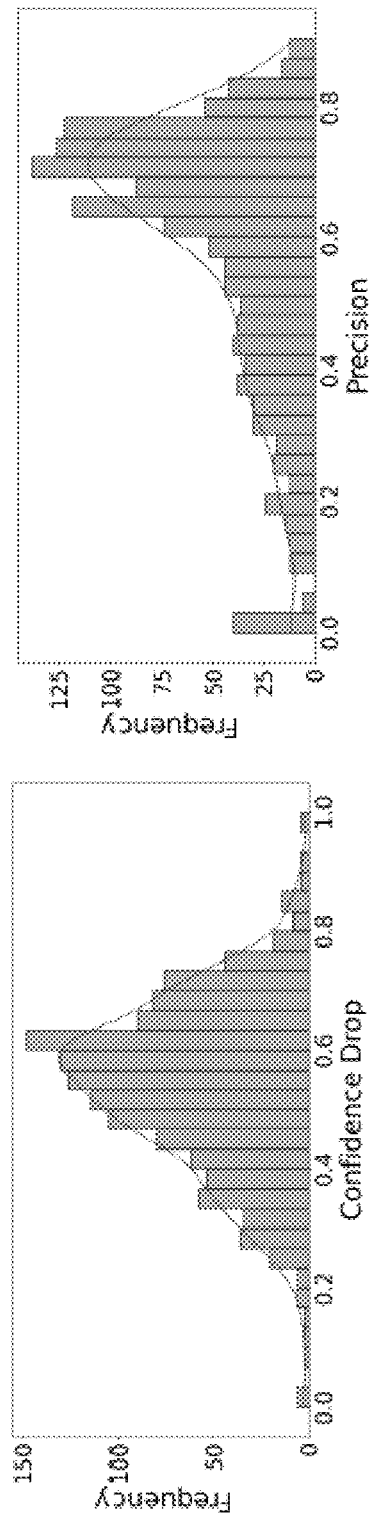
Figure 9F:
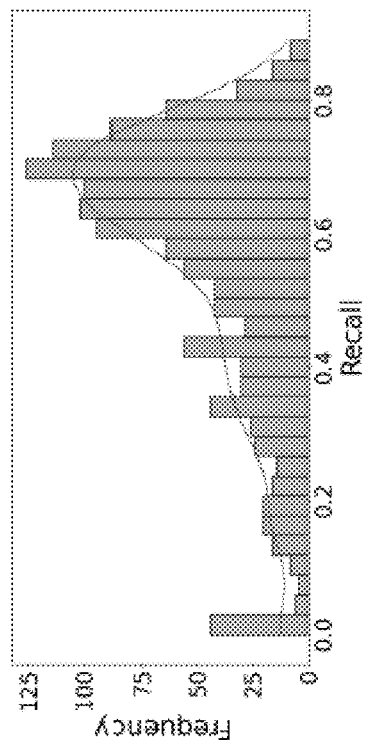
Figure 10:
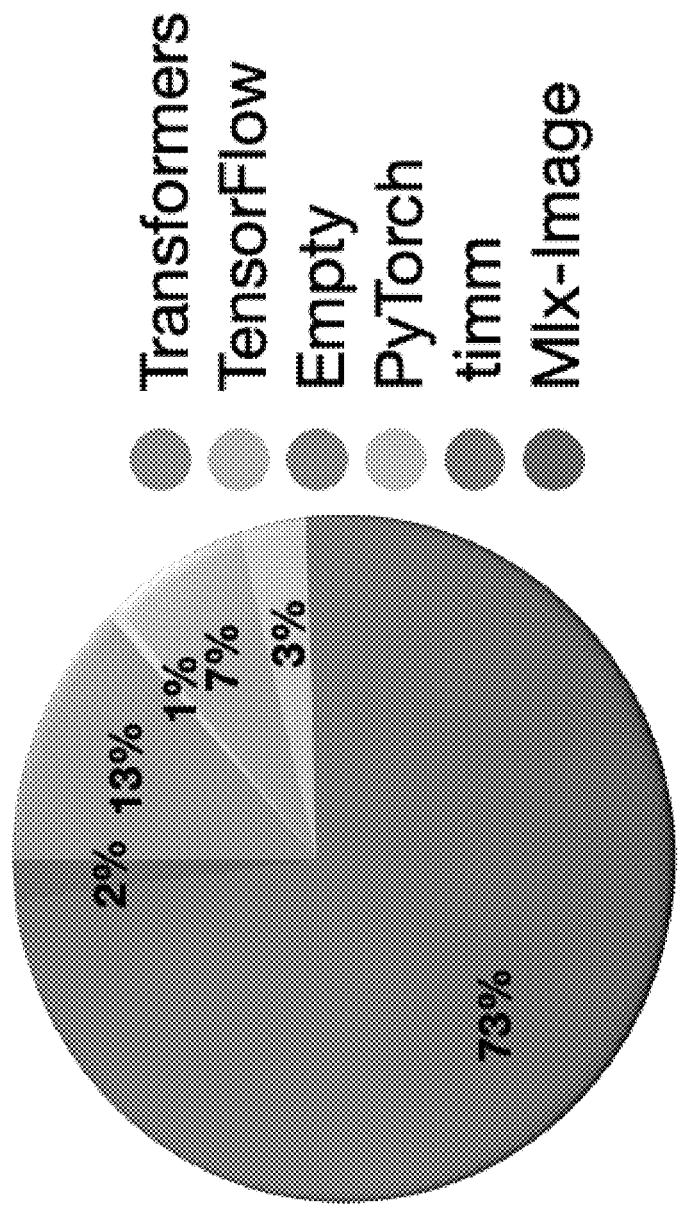
FIG. 10 shows the statistical distribution of the collected models with their corresponding pre-defined categories in Hugging Face platform.

FIGS. 6(a)-6(c) show the frequency distribution of adversarial metrics across all the tested models, and FIGS. 7(a) and 7(b) illustrate the frequency distribution of out-of-distribution metrics across the tested models. The majority of the models have low OOD AUROC and OOD AUPR values, and the highest frequency range between 0 and 20. Such distribution shows that a large number of models cannot perform well in the presence of out-of-distribution samples. While only a few models are robust against out-of-distribution samples, the remaining models still suffer from major precision and recall reduction issues.

Pairwise Metric Analysis: The pairwise relationships between the natural adversarial attack metrics and the out-of-distribution attack metrics were further analyzed. In FIGS. 8(a)-8(f), scatter plots illustrated such a relationship. First, the adversarial accuracy decreases as the OOD AUPR increases. This inverse relationship suggests that the models that have higher robustness against out-of-distribution attacks might likely perform poorly when tested against natural adversarial attacks. This is also observed between the OOD AUPR and the adversarial AURRA. Second, the OOD AUPR and RMS calibration error lack a clear correlation. Third, a quite similar pattern can be found between the OOD AUROC and the adversarial accuracy. In fact, models with higher OOD AUROC values might likely suffer from low adversarial accuracy. Therefore, achieving both high adversarial accuracy and high OOD AUROC is challenging. Similarly, OOD AUROC and the RMS calibration error are not correlated. Overall, the pairwise relationship across the metrics conveys the challenge of providing a robust defense mechanism for both black-box attacks.

Example 3—White-Box Attack Module Evaluation

In the White-box Attack Module, the models using two different setups, namely the attack-oriented setup and the model-oriented setup, were evaluated. The validation set of the ImageNet dataset to generate all the adversarial samples within this module was considered. For the attack-oriented setup, all the models against the FGSM attack were tested. The FGSM attack was selected given its computational efficiency as it does not require extensive computational resources. Moreover, the FGSM attack enables faster generation of adversarial samples across multiple models compared to other adversarial attacks such as the DeepFool attack.

Additionally, the FGSM attack is one of the most widely used and popular adversarial attacks given its simplicity and applicability in different domains. Further, the FGSM attack is independent of the model itself, making it an ideal example for the current prototype testing. For the second configuration setup, one model to be tested against all the adversarial attacks has been selected within the White-box Attack Module. The microsoft/swinv2-tiny-patch4-window16-256, one of the top 10 most downloaded models (i.e., up to 316,067 downloads by October 2024) was considered and trained on the ImageNet dataset. This model is a tiny variant of the SwinV2 model, a state-of-the-art Vision Transformers (ViT). Note that this variant's design is computationally efficient and has demonstrated notable performance across different vision tasks. In what follows, attack-oriented and model-oriented evaluations are presented.

Attack-oriented Setup: In this setup, the FGSM attack was applied across all the public models. The experimental results illustrate the frequency distribution of different performance metrics in FIGS. 9(a)-9(f). These performance metrics comprise the adversarial accuracy, the attack success rate, the F1 Score, the confidence drop, the precision, and the recall. First, a widespread range distribution of the adversarial accuracy ranging between 20% and 75% was observed. This shows that the FGSM attack significantly differs across the models. However, some models are highly vulnerable, where the adversarial accuracy is almost 0%. This is validated by the frequency distribution of the attack success rate that reaches 100% for some models. Furthermore, the variation in the F1 Score and the precision shows that some models might likely be more resilient against adversarial attacks than others, given the nature of the model's architecture.

Model-oriented Setup: FIG. 13 shows the evaluation results for the attack victim model, microsoft/swinv2-tiny-patch4-window16-256, by considering the adversarial and the non-adversarial metrics. It can be observed a serious model vulnerability when tested against the LBFGS attack, reaching less than 6% accuracy. Compared to the FGSM attack, which has higher adversarial accuracy, the poor performance of the model against the LBFGS attack indicates that more complex attacks can cause significant degradation in model performance, leading to reduced precision, recall, and F1 Score. On the other hand, a notable confidence drop is noted by approximately 50% triggered by all the adversarial attacks. This drop highlights a reduction in the model's prediction confidence. However, it does not offer direct information regarding the model's performance. Simple and classical attacks, such as the FGSM attack, suffer from low attack effectiveness with relatively high adversarial accuracy. In contrast, optimized and iterative attacks can cause a noticeable performance drop with minimal recall and precision of attack target models.

Example 4—Adversarial Transferability Module Evaluation

Figure 14:
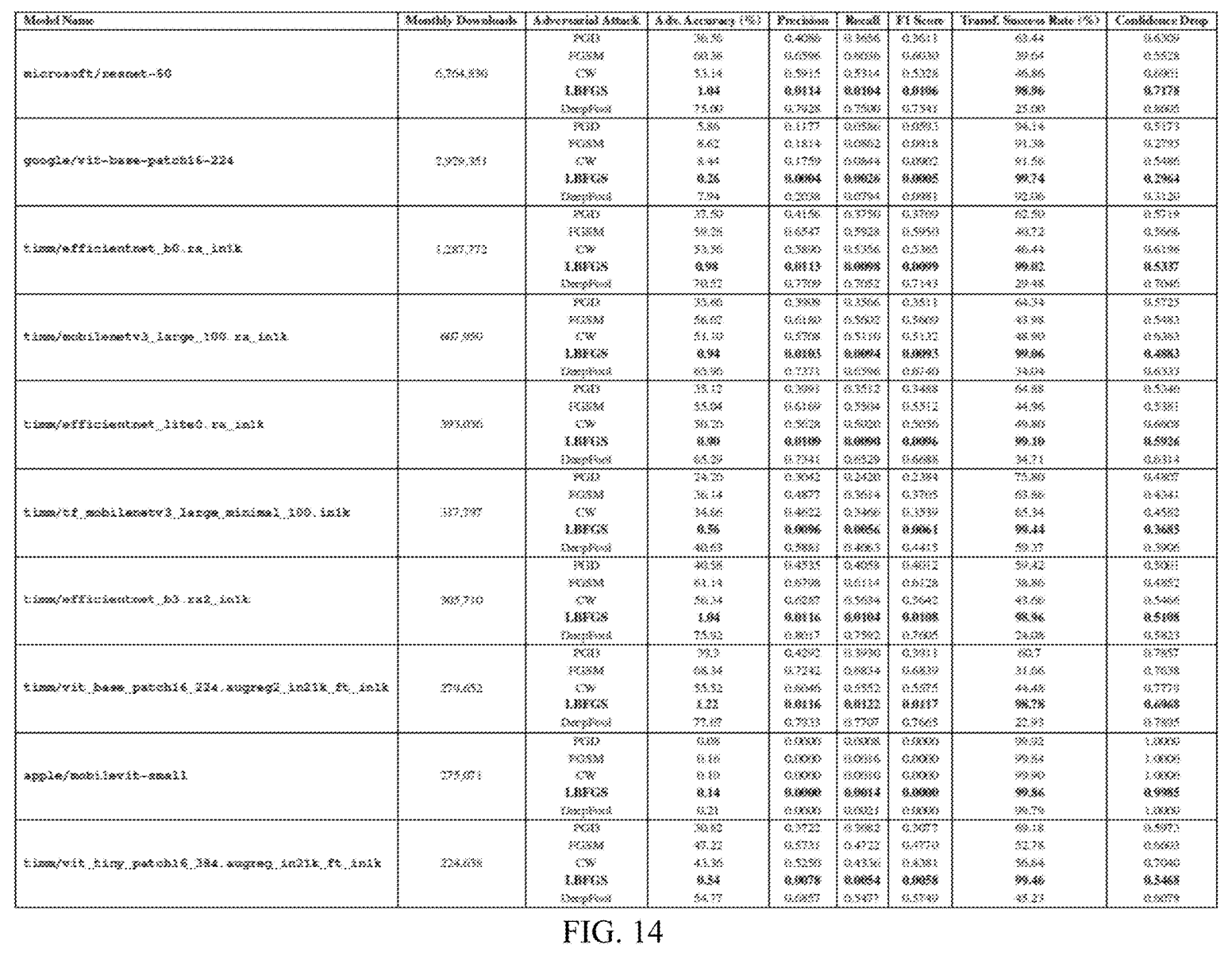

According to the performance evaluation in the model-oriented setup regarding the attack victim model, microsoft/swinv2-tiny-patch4-window16-256, in this module the possibility of transferring the adversarial attacks to other models was investigated. In this context, the top 10 most downloaded models were selected on a monthly basis to explore if the adversarial attacks are transferable. FIG. 14 reports the experimental results for each model. First, a relatively high adversarial accuracy for the microsoft/resnet-50 model was observed. It achieved 60.36% and 75.00% adversarial accuracy for the FGSM and DeepFool attacks, respectively. Regardless, there was a significant increase in the confidence drop for the DeepFool attack. This increase implies that although the high adversarial accuracy performed by the microsoft/resnet-50 model, it still suffers from model certainty issues against such an attack. On the other hand, the LBFGS attack is still highly effective, where the attack success rate reached 98.96%. The LBFGS attack demonstrates strong transferability across different models, where the LBFGS attack success rate across the remaining models is over 98%. Moving forward, the google/vit-base-patch16-224 model exhibits significant vulnerability under transfer attacks where almost all the adversarial attacks achieved an attack success rate above 90%. Despite the effectiveness of these attacks, the model's confidence drop is relatively moderate when compared with other models. Another interesting finding is the extremely poor performance of the apple/mobilevit-small model, where the adversarial accuracy is nearly 0% across all the adversarial attacks, and with a significant confidence drop that reaches almost 1.0. This model shows severe vulnerabilities and might not be reliable when deployed in different real-world applications. Overall, the experimental results show that the LBFGS attack exhibits a high attack transferability and effectiveness across all the models, whereas some model-specific architectures, such as ResNet and Vision Transformers (ViT), are likely to be robust against specific adversarial attacks. Furthermore, the confidence drop variation across the models highlights a certainty imbalance even for the most resilient models. In contrast, the majority of lightweight models are most likely to be highly vulnerable to adversarial attacks.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for automatic vulnerability assessment of machine learning (ML) models, the system comprising:
 a processor; and
 a machine-readable medium in operable communication with the processor and having instructions stored thereon that, when executed by the processor, perform the following steps:
  i) receiving a targeted model, the targeted model being trained on a dataset and on customized adversarial settings received from a user via an interface;
  ii) storing the targeted model and the dataset in a local database;
  iii) curating the targeted model to handle model-specific requirements via preprocessing techniques, the preprocessing techniques comprising resizing, tokenization, and normalization;
  iv) loading required libraries and frameworks;
  v) evaluating performance of the targeted model, using the required libraries and frameworks, in non-adversarial settings on validation datasets;
  vi) performing an automated series of adversarial attacks to assess robustness of the targeted model and locate vulnerabilities in the targeted model;
  vii) systematically feeding the located vulnerabilities to a performance assessment module for further analysis;

viii) evaluating the robustness of the targeted model according to a set of predefined performance metrics and storing the vulnerabilities in the local database in case the same model is requested by another user; and ix) generating a vulnerability report and providing the vulnerability report to the user, the vulnerability report comprising a security report on the targeted model, steps i)-ix) being performed using a multi-layered architecture, the multi-layered architecture comprising:
  a) a hardware layer;
  b) a framework and libraries layer;
  c) a data layer;
  d) a model management layer;
  e) a security assessment layer; and
  f) a user interface layer, and the framework and libraries layer being configured to: support automating of preprocessing and configuration of the targeted model, and dynamically detect a framework type a architecture, of the required libraries and frameworks, during execution time by integrating a set of application programming interfaces (APIs) with the required libraries and frameworks.

2. The system according to claim 1, the hardware layer comprising a graphical processing unit (GPU) and a central processing unit (CPU).

3. The system according to claim 1, the data layer being configured to manage data storing capabilities using dataset storage, model storage, and logging storage.

4. The system according to claim 1, the model management layer being configured to monitor, deploy, and curate the targeted model by incorporating model curation, model deployment, and model logging.

5. The system according to claim 1, the security assessment layer comprising a black-box attack module, a white-box attack module, an adversarial transferability module, a performance assessment module, and a vulnerability reporting module.

6. The system according to claim 5, the black-box attack module comprising a natural perturbation attack and an out-of-distribution attack.

7. The system according to claim 5, the white-box attack module comprising projected gradient descent (PGD) attack, fast gradient sign method (FGSM) attack, Carlini and Wagner (CW) attack, limited-memory Broyden-Fletcher-Goldfarb-Shanno (L-BFGS) attack, and DeepFool attack.

8. The system according to claim 1, the user interface layer being configured to enable the user to automate testing the targeted model by combining model selection, dataset selection, and adversarial configuration.

9. A method for automatic vulnerability assessment of ML models, the method comprising:
  i) receiving a targeted model, the targeted model being trained on a dataset and on customized adversarial settings received from a user via an interface;
  ii) storing the targeted model and the dataset in a local database;
  iii) curating the targeted model to handle model-specific requirements via preprocessing techniques, the preprocessing techniques comprising resizing, tokenization, and normalization;
  iv) loading required libraries and frameworks;
  v) evaluating performance of the targeted model, using the required libraries and frameworks, in non-adversarial settings on validation datasets;
  vi) performing an automated series of adversarial attacks to assess robustness of the targeted model and locate vulnerabilities in the targeted model;
  vii) systematically feeding the located vulnerabilities found to a performance assessment module for further analysis;
  viii) evaluating the robustness of the targeted model according to a set of predefined performance metrics and storing the vulnerabilities in the local database in case the same model is requested by another user; and
  ix) generating a vulnerability report and providing the vulnerability report to the user, the vulnerability report comprising a security report on the targeted model, steps i)-ix) being performed using a multi-layered architecture, the multi-layered architecture comprising:
  a) a hardware layer;
  b) a framework and libraries layer;
  c) a data layer;
  d) a model management layer;
  e) a security assessment layer; and
  f) a user interface layer, and the framework and libraries layer being configured to: support automating of preprocessing and configuration of the targeted model; and dynamically detect a framework type and architecture of the required libraries and frameworks, during execution time by integrating a set of application programming interfaces (APIs) with the required libraries and frameworks.

10. The method according to claim 9, the hardware layer comprising a graphical processing unit (GPU), and a central processing unit (CPU).

11. The method according to claim 9, the data layer being configured to manage data storing capabilities using dataset storage, model storage, and logging storage.

12. The method according to claim 9, the model management layer being configured to monitor, deploy, and curate the targeted model by incorporating model curation, model deployment, and model logging.

13. The method according to claim 9, the security assessment layer comprising a black-box attack module, a white-box attack module, an adversarial transferability module, a performance assessment module, and a vulnerability reporting module.

14. The method according to claim 13, the black-box attack module comprising a natural perturbation attack and an out-of-distribution attack, and the white-box attack module comprising projected gradient descent (PGD) attack, fast gradient sign method (FGSM) attack, Carlini and Wagner (CW) attack, limited-memory Broyden-Fletcher-Goldfarb-Shanno (L-BFGS) attack, and DeepFool attack.

15. The method according to claim 9, the user interface layer being configured to enable the user to automate testing the model by combining model selection, dataset selection, and adversarial configuration.

16. A system for automatic vulnerability assessment of ML models, the system comprising:
  a processor; and
  a machine-readable medium in operable communication with the processor and having instructions stored thereon that, when executed by the processor, perform the following steps:
    i) receiving a targeted model, the targeted model being trained on a dataset and on customized adversarial settings received from a user via an interface;
    ii) storing the targeted model and the dataset in a local database;
    iii) curating the targeted model to handle model-specific requirements via preprocessing techniques, the preprocessing techniques comprising resizing, tokenization, and normalization;

iv) loading required libraries and frameworks;
v) evaluating performance of the targeted model, using the required libraries and frameworks, in non-adversarial settings on validation datasets;
vi) performing an automated series of adversarial attacks to assess robustness of the targeted model and locate vulnerabilities in the targeted model;
vii) systematically feeding the located vulnerabilities to a performance assessment module for further analysis;
viii) evaluating the robustness of the targeted model according to a set of predefined performance metrics and storing the vulnerabilities in the local database in case the same model is requested by another user; and
ix) generating a vulnerability report and providing the vulnerability report to the user, the vulnerability report comprising a security report on the targeted model,
steps i)-ix) being performed using a multi-layered architecture,
the multi-layered architecture comprising:
 a) a hardware layer;
 b) a framework and libraries layer;
 c) a data layer;
 d) a model management layer;
 e) a security assessment layer; and
 f) a user interface layer,
the hardware layer comprising a graphical processing unit (GPU), and central processing unit (CPU),
the framework and libraries layer being configured to:
 support automating of preprocessing and configuration of the targeted model; and dynamically detect a framework type and architecture, of the required libraries and frameworks, during execution time by integrating a set of application programming interfaces (APIs) with the required libraries and frameworks,
the data layer being configured to manage data storing capabilities using dataset storage, model storage, and logging storage,
the model management layer being configured to monitor, deploy, and curate the targeted model by incorporating model curation, model deployment, and model logging,
the security assessment layer comprising a black-box attack module, a white-box attack module, an adversarial transferability module, a performance assessment module, and a vulnerability reporting module,
the black-box attack module comprising a natural perturbation attack and an out-of-distribution attack, and the white-box attack module comprising projected gradient descent (PGD) attack, fast gradient sign method (FGSM) attack, Carlini and Wagner (CW) attack, limited-memory Broyden-Fletcher-Goldfarb-Shanno (L-BFGS) attack, and DeepFool attack, and
the user interface layer being configured to enable the user to automate testing the targeted model by combining model selection, dataset selection, and adversarial configuration.

* * * * *